May 2, 1961 R. T. MOORE 2,982,425
WEIGHT INDICATING MATERIAL HANDLING DEVICE
Filed Aug. 21, 1957 6 Sheets-Sheet 1

INVENTOR.
RALPH T. MOORE
BY
RICHEY, WATTS, EDGERTON,
MCNENNY & FARRINGTON.
B D Watts
ATTORNEYS May 2, 1961 R. T. MOORE 2,982,425
WEIGHT INDICATING MATERIAL HANDLING DEVICE
Filed Aug. 21, 1957 6 Sheets-Sheet 2

INVENTOR.
RALPH T. MOORE
BY
RICHEY, WATTS, EDGERTON,
McNENNY & FARRINGTON.
ATTORNEYS

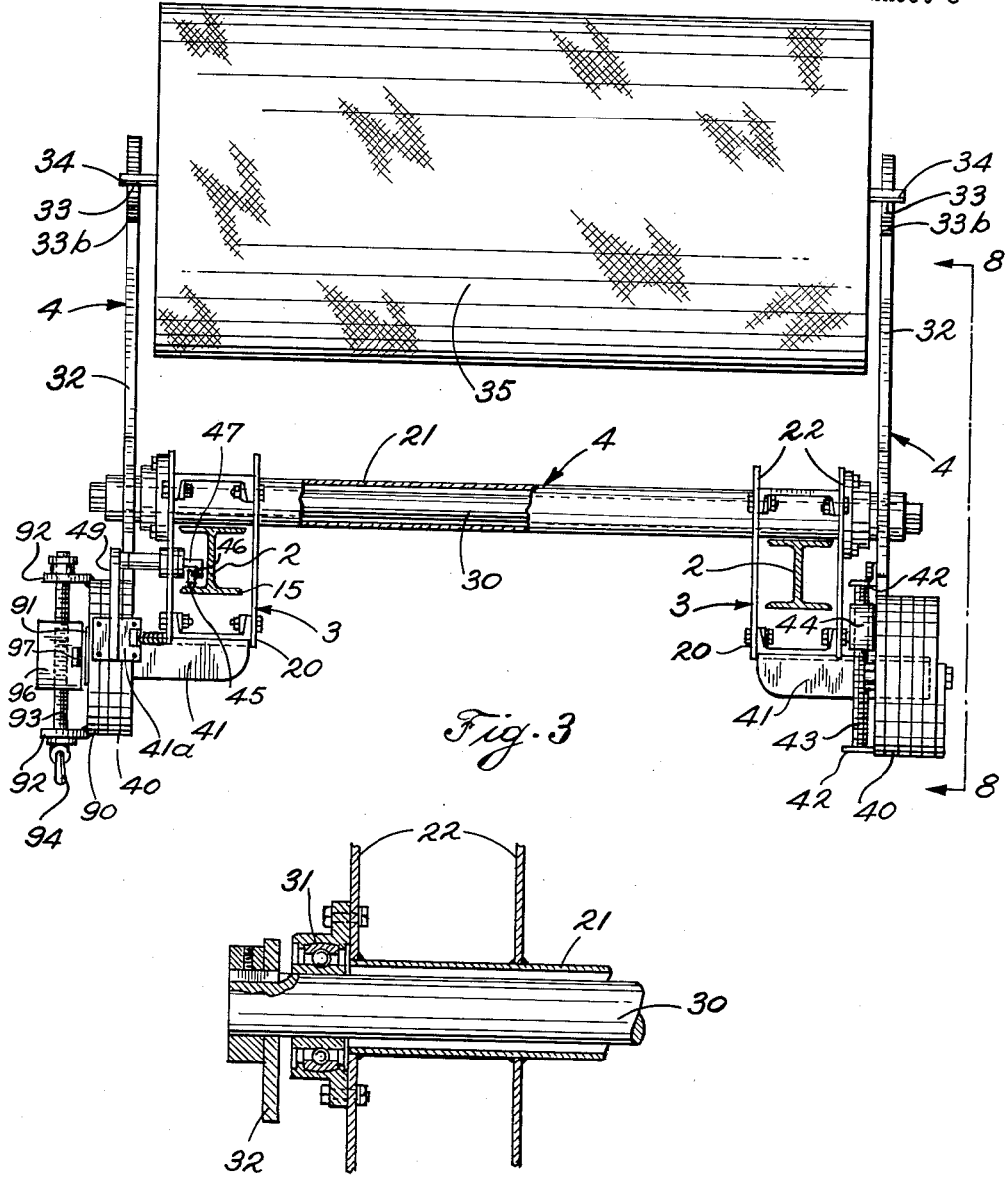

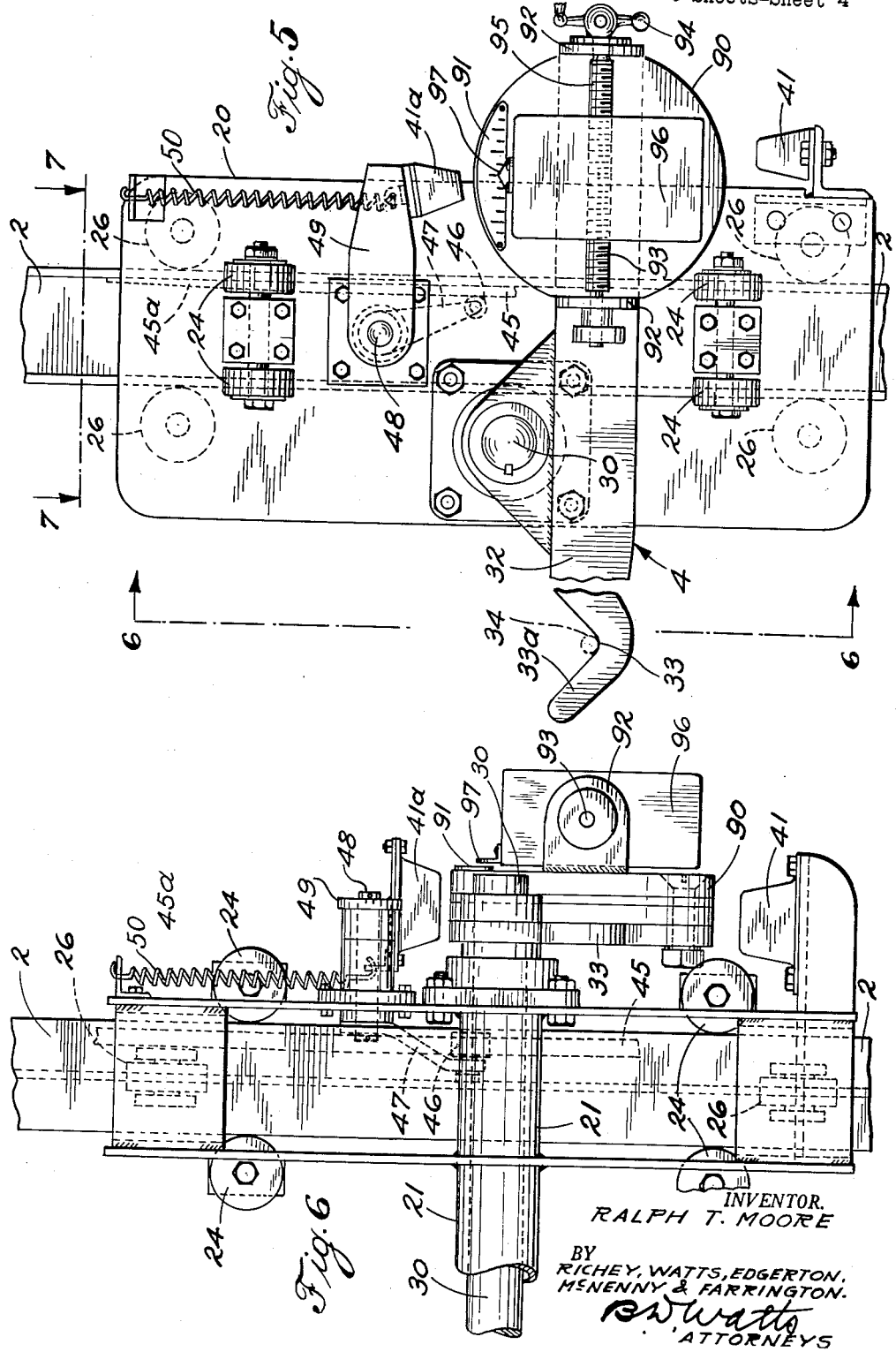

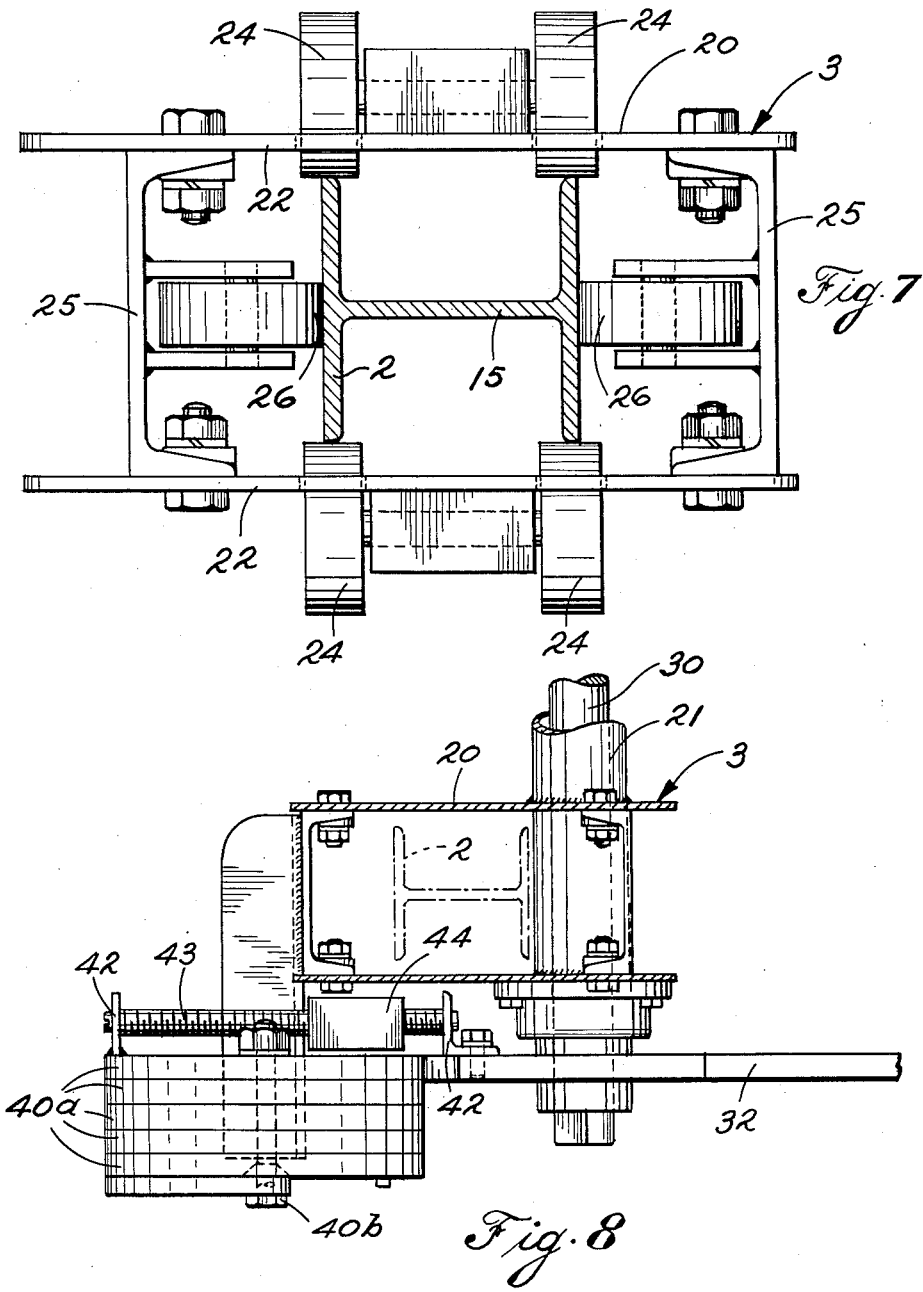

May 2, 1961  R. T. MOORE  2,982,425
WEIGHT INDICATING MATERIAL HANDLING DEVICE
Filed Aug. 21, 1957  6 Sheets-Sheet 6
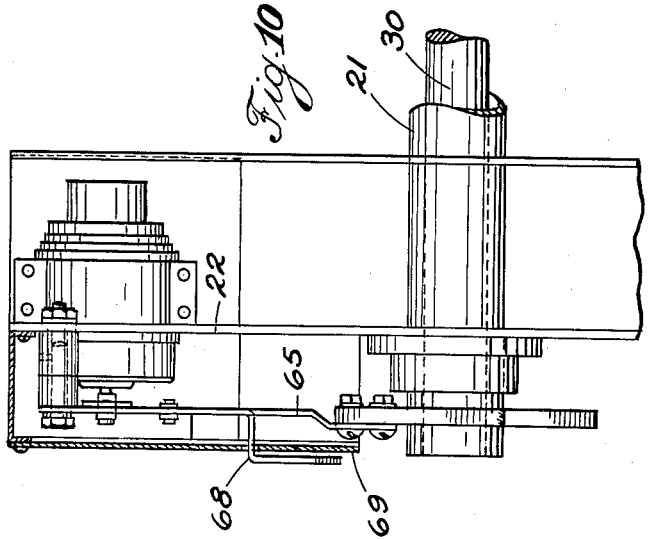
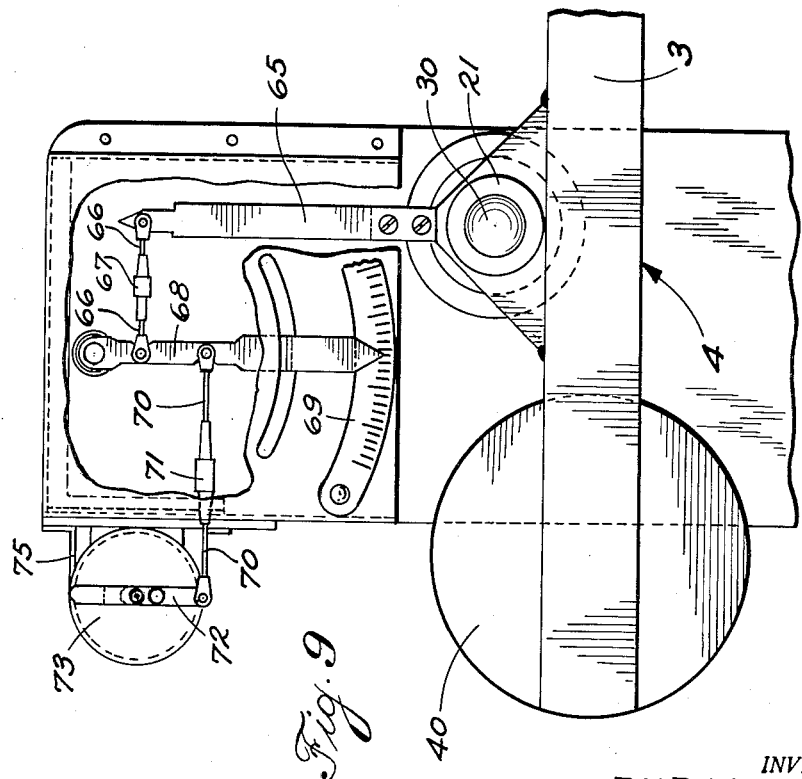
INVENTOR.
RALPH T. MOORE
BY
RICHEY, WATTS, EDGERTON,
McNENNY & FARRINGTON.
ATTORNEYS

United States Patent Office 2,982,425
Patented May 2, 1961

2,982,425
WEIGHT INDICATING MATERIAL HANDLING DEVICE

Ralph T. Moore, Lakewood, Ohio, assignor to The American MonoRail Company, Cleveland, Ohio, a corporation of Ohio Filed Aug. 21, 1957, Ser. No. 679,500

11 Claims. (Cl. 212—2)

This invention relates generally to the art of material handling and is more particularly concerned with apparatus for handling picker laps and indicating whether they are within specified weight tolerance.

Picker laps tend to vary in weight from lap to lap, and when one varies beyond the permissible weight range, it must be set aside and reworked since sliver, roving and yarn made from laps which vary outside of the permissible range will vary beyond their prescribed limits. Although the need for maintaining picker laps within the prescribed weight range has long existed, many others have tried in vain to solve the problem heretofore, so far as I am aware.

According to prior practice the picker operator sets a picker to produce a lap which he estimates will weigh within the prescribed weight range. When the lap is made, not only its total weight but also the extent of its variation from the tolerance prescribed are determined. This operation takes appreciable time and requires close attention of the picker operator and expensive, accurate, sensitive scales. Then the lap is sent on to the card room or is set aside for reworking depending on whether its variation is within or outside of the tolerance range. Since the operator has to handle and weigh the lap before he knows whether it is within the tolerance range and, since the next lap is being produced while he is so occupied, it follows that any adjustment of the picker which he must make to bring the next lap within the tolerance range will not affect the substantial amount of lap made while he is so occupied and consequently he must overadjust for the remainder of that lap.

Moreover, the operator often has to lift the laps and carry them from the picker to a truck and this calls for the expenditure of considerable energy since an average lap weighs about sixty pounds, and this procedure also acts as a practical limit on the weight of laps which could, advantageously, be greater if the laps were handled mechanically.

The present invention aims to solve this long standing problem and achieves that aim by providing mechanical lap handling apparatus which relieves the operator of most of the laplifting and carrying work, does not involve expensive, accurate scales and does not determine the weight of the lap but merely indicates whether the lap is within the tolerance range. Apparatus embodying the present invention is rapid in action, requires but little attention of the operator, and enables him to make more nearly exact adjustments in the picker and within a shorter time after removal of a completed lap, thereby avoiding over adjustments.

In the drawings accompanying and forming a part of this specification:

Fig. 3 is a cross-sectional view taken on line 3—3 of Fig. 1;

Fig. 4 is a fragmentary view of one end of the lap carrying carriage taken on line 4—4 of Fig. 1;

Fig. 5 is an elevational view of the left end of the lap carrying carriage of Fig. 2;

Fig. 6 is an elevational view of the apparatus of Fig. 5 taken at right angles thereto from line 6—6;

Fig. 7 is a horizontal view partly in section taken on line 7—7 of Fig. 5;

Fig. 8 is a top plan view partly in section of the right end of the lap carrying carriage of Fig. 2;

Fig. 9 is a fragmentary, side elevational view of the right end of the carriage of Fig. 2 showing weight indicating apparatus; and Fig. 10 is a view taken at right angles to Fig. 9.

Figure 1:
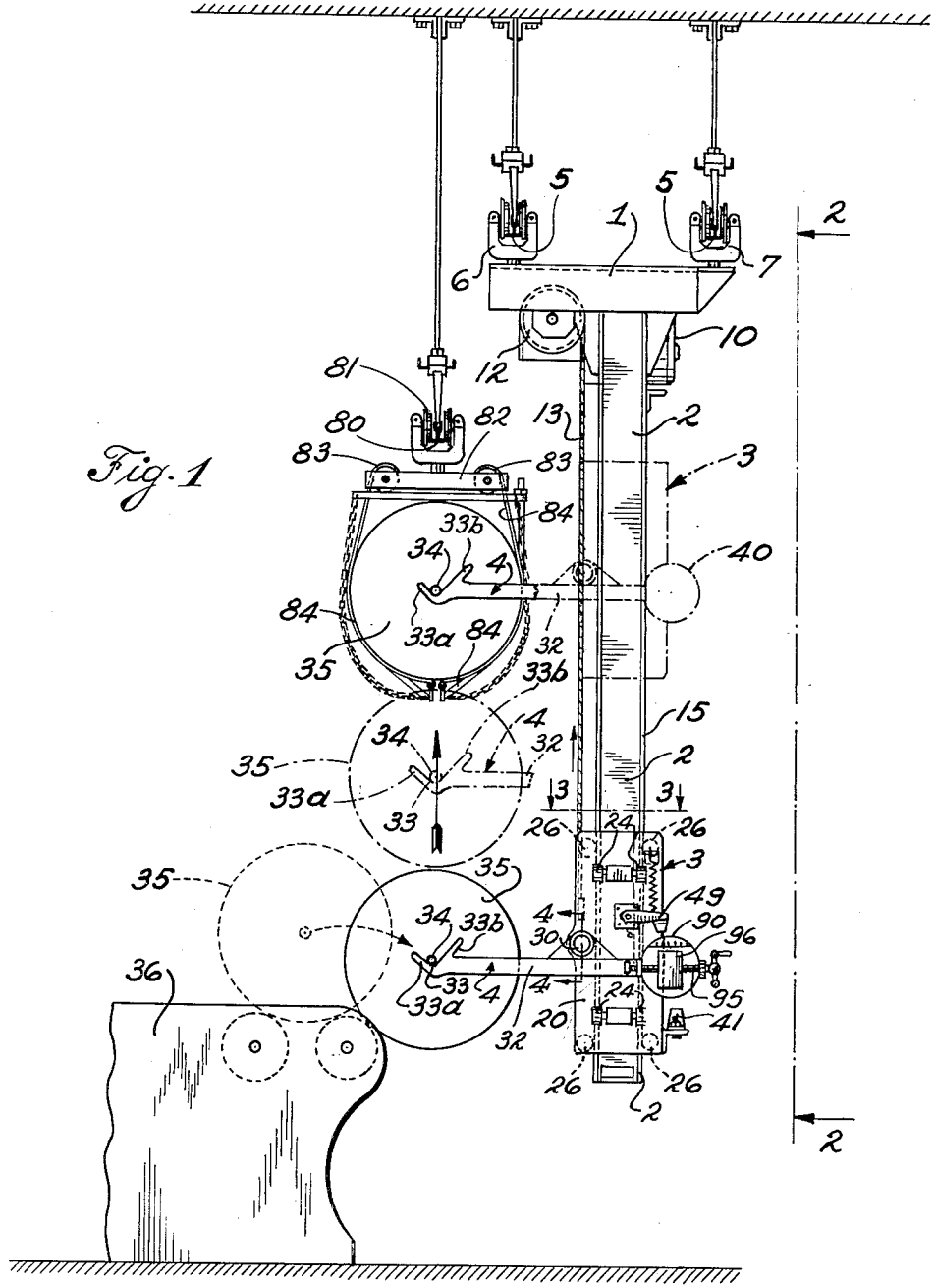
Fig. 1 is an end elevational view of one form of apparatus embodying the present invention.
Figure 2:
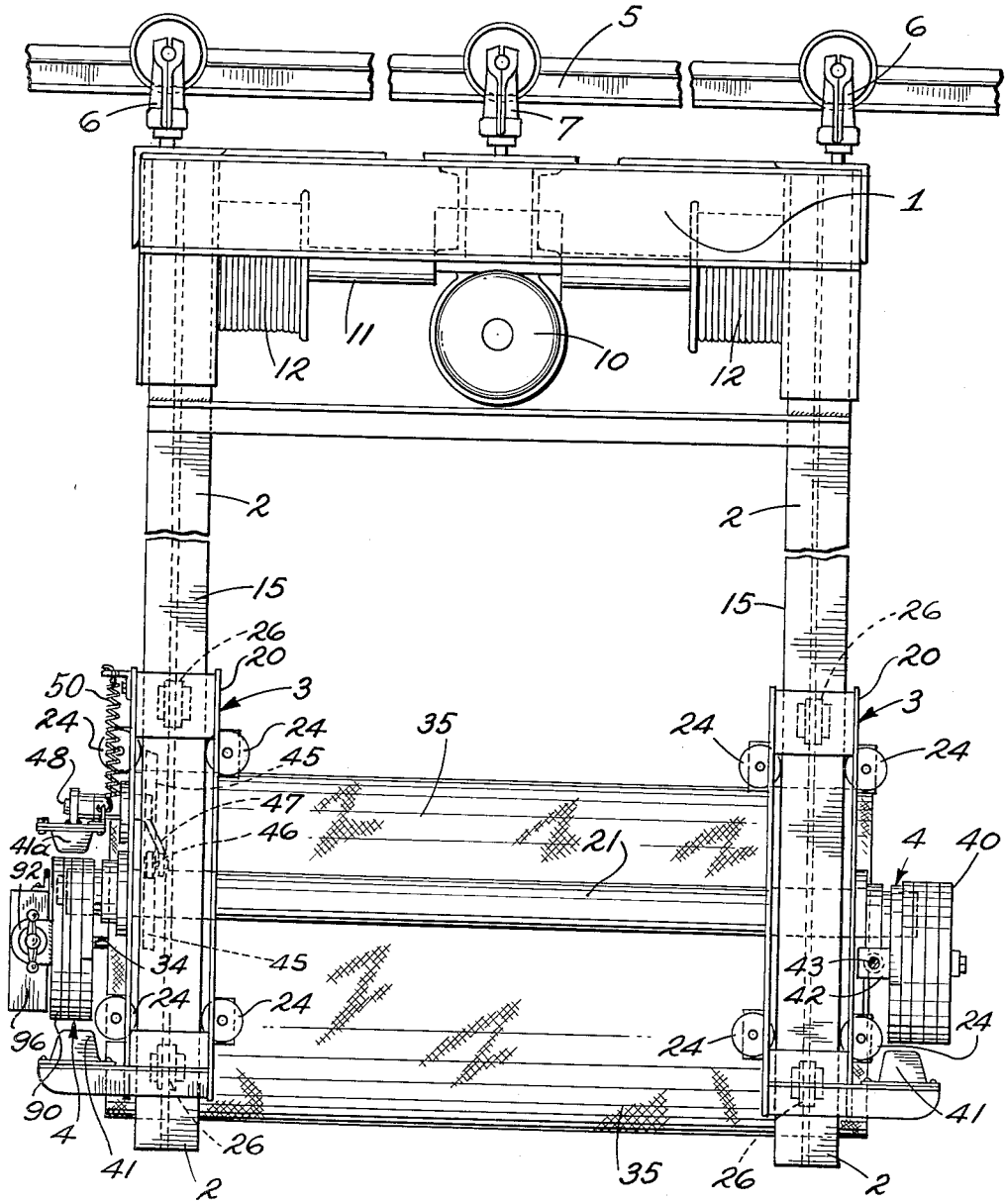
Fig. 2 is a side elevational view, on a larger scale and with parts broken away, of the apparatus of Fig. 1.

In the drawings, Figs. 1, 2 and 3 show a device embodying the present invention having a head section 1 and depending legs 2 with a carriage 3 mounted for movement up and down the legs and an article support indicated generally at 4.

The head section 1 is a frame which is rectangular in plan view, is supported from suspended rails 5 by two trolleys 6 on one side of the frame and a single trolley 7 on the other side, the latter trolley being movable toward and away from the pair of trolleys by reason of having a shank (not shown) extending through an elongated, transverse hole in the frame. This possibility of lateral shifting of the trolley on the frame is to permit the trolleys to travel around curves without unnecessary friction. The head section 1 also supports a motor 10, the rotor shaft of which is suitably connected to shaft 11 to rotate the latter. This shaft 11 carries near either end thereof drums 12 on which cables 13 connected to the carriage 3 may be wrapped for raising and lowering movement of the carriage.

The legs 2 comprise vertical H-beams 15 fastened at their upper ends to the head section 1 and spaced apart a distance sufficient to accommodate a workman therebetween.

The carriage 3 consists of end members 20 and a tubular connector 21. Each end member comprises two plates 22 arranged on opposite sides of beam 15 and these plates carry shafts on which guide rollers 24 are rotatably mounted in position to run on the edges of the flanges of the H-beam 15. Channels 25, which connect plates 22, carry guide rollers 26 on the flat sides of H-beam 15. The tubular connector 21 extends through several plates 22 and is suitably connected to them as by welding so that the carriage member 3 is rigid and shape-sustaining due to the firm attachment of connector 21 to the four plates 22. This carriage is movable up and down the legs 2 by cables 13 with but little friction and without cocking because of the presence of the several sets of guide rollers.

The carriage 3 also includes means for engaging an article to be handled. This means includes shaft 30 which extends through tubular connector 21, is supported near its ends on the outer sides of outer plates 22 in self-aligning bearings 31 and has secured to its ends a pair of arms 32. These arms 32 are provided at their free ends with forwardly and rearwardly inclined portions 33a and 33b to receive therebetween lap pin 34 of a picker lap 35. The arms 32 are of such a length that when a workman stands between legs 2 and against tubular connector 21 his hands may reach a picker lap on the picker 36 beyond the free ends of arms 32 and roll the lap onto those arms.

Arms 32 are provided with counterweights 40 at their ends opposite ends 33 and these counterweights may be adjusted so as approximately to balance any article which is to be supported on the opposite ends of the arms. Resilient bumpers 41 are carried by end members 20 to engage counterweights 40 and limit the extent of their down motion.

One arm 32 (see Fig. 8) is provided with brackets 42 in which is rotatably mounted a threaded rod 43. An elongated balancing weight 44 is threaded onto rod 43 and may be moved lengthwise on the rod when the latter is rotated. The counterweight 40 consist of discs 40a attached to arms 32 as by bolts 45. By adding or taking away discs 40a, the counterweight may be approximately adjusted to the weight of the article to be handled and final adjustment may be made by shifting weight 44 along rod 43.

It will be understood that, unless restrained, the arms 32 would oscillate above their pivots when a lap is rolled onto their free ends and such oscillation would prolong the time required to bring the arms to rest and to determine whether the lap is within the tolerance range.

One form of means to prevent such oscillation is shown in Figs. 1, 2, 3, 5 and 6. That means includes a bar 45 secured to a leg 2 and having a cam surface 45a to engage a roller 46 on lever 47 which is keyed to a shaft 48 extending through and rotatably supported by one member 20 of carriage 3. A lever 49 is keyed to the outer end of shaft 47 and carries a bumper 41a similar to bumper 41. A spring 50 attached to carriage 3 and to lever 49 urges roller 46 against cam surface 45a. When carriage 3 is in its down, or lap receiving position, roller 46 is on the high part of cam surface 45a and bumper 41a bears on the top of the adjacent counterweight 40 and prevents downward movement of the free ends of arms 32 when a lap is placed thereon. As the carriage is moved up along legs 2, the roller 46 runs along an inclined part of cam surface 45a and frees the shaft 48 for rotation to move bumper 41a out of contact with counterweight 40. Thereupon the arms will be free to rotate and indicate the variance of the lap, if any, from the tolerance range. Thus repeated oscillations of the arms may be avoided and the operator's time is correspondingly conserved.

On one of shaft 30 (Figs. 9 and 10), a lever 65 extends upwardly and near its upper end is connected to a rod 66 which is fitted with a turnbuckle 67. This turnbuckle is also connected to a similar rod 66 which is pivotally connected to a pointer 68. This pointer 68 is pivotally connected to the adjacent plate 22 of the support assembly or carriage and extends downwardly and overlaps a scale 69 which is marked to indicate weight variations of the articles being handled from a predetermined weight. By adjusting turnbuckle 67, pointer 68 may be shifted so that the point of its lower end will coincide with the zero point on scale 69 when the weight and the article on the arms 32 are in balance and the article weighs the predetermined amount.

If it is desired to indicate, at a remote place, the position of pointer 68 at any given time, a Selsyn motor and generator system 73 may be employed. To that end a rod 70 is pivotally connected to pointer 68 and is connected by means of a turnbuckle 71 to a similar rod 70 which is attached to arm 72 of a Selsyn generator 73 which generator may be supported by a bracket 75 on the support 3 above one of the arms 32. This generator 73 is electrically connected to a Selsyn motor 74 (not shown) which has an indicator movable along a scale similar to scale 69 in accordance with movement of pointer 68 and arm 72 of generator 73.

Adjacent to the track 5 on which trolley 7 is mounted is positioned a suspended trolley track 80 (Fig. 1). This track is provided with means for transporting articles which have been weight tested by the device just described. Any suitable transporting means may be provided to run on track 80 but one form which has been found to be satisfactory in commercial use is that disclosed in the copending application of Frank C. Harris, Serial No. 342,346, filed on or about March 6, 1953. Since that device is not a part of the present invention, it is believed that it will be sufficient to describe it very briefly. It comprises trolleys 81 to run on track 80, a frame 82 suspended from the trolleys and carrying rollers 83 disposed parallel to the track 80 and curtains 84 attached to these rollers. The rollers are movable endwise in the frame supported by the trolleys and the free ends of the curtains may be fastened together beneath an article to be conveyed, for example, a picker lap 35. When a picker lap carried by these curtains is to be discharged to a receiver, the curtains and lap are moved in a direction opposite to that of the travel of the trolleys and the curtains are disconnected to deposit the picker lap in approximately vertical movement onto the receiver.

The operation of the weight-indicating, material-handling device above described will be understood by those skilled in the art from the drawings and the foregoing description with perhaps but little additional explanation.

When, for example, this device is used in connection with picker laps, the operator moves the device along rails 5 until the legs 2 are at the discharge end of a picker lap making machine 36. Then the operator steps into the space between the legs 2, reaches forward and rolls a lap 35 toward the device and brings the lap pin 34 of the lap into the notches between included portions 33a and 33b of arms 32. Then he actuates a switch (not shown) thereby energizing motor 10 which rotates drum 12 and winding up cables 13 and thereby raising the lap a short distance with release of the bumper 41a from the counterweight and freeing the arms to move and thereby indicate whether the lap is within the tolerance range. If the picker lap does not vary in weight enough to move the pointer 68 off the permissible range of weight indicated thereon, the picker lap is suitable for use with a card machine. As soon as that condition has been noted, the operator raises the support or carriage 3 and picker lap to the top full line position shown in Fig. 1, and pulls together the ends of curtains 84 on the lap handler which is on track 80 and hooks them together beneath the lap 35. Then the operator reverses the direction of rotation of motor 10 and lower support 3 to the full line position shown in Fig. 1 and frame 82 carries the lap into a card room. As soon as the support 3 has been lowered to a place below the lap which is supported by curtain 84, the apparatus embodying the present invention may be moved along rails 5 to a position at the end of the next picker lap making machine where the foregoing operations may be repeated.

In case the lap is outside of the allowed tolerance range, it may be set aside for reworking either by being removed manually from arms 32 or by being removed by frame 82 and transported to the space reserved for storing off-weight laps.

Since variations in the moisture content in the fibers of the laps varies from time to time, it is necessary to compensate for such variations if the laps are to contain the same weights of fiber. One form of means suitable for use in making such moisture regain adjustments is shown in Figs. 3, 5 and 6. There a disc 90, quite like discs 40a, is attached by bolt 40b to the counterweight 40 opposite the one provided with the adjustment weight 44. This disc 90 has a weight graduated scale 91 thereon. Lugs 92 project from the face of disc 90 and carry a rotatable rod 93 having a rotating handle 94 at one end and having threads 95. A weight 96 has threaded engagement with rod 95 and carries a pointer 97 to move along scale 91 when handle 94 is turned.

When a variation in moisture in the picker room is noted, the picker operator turns handle 94 to shift weight 96 in the proper direction to compensate for the moisture variation and thereafter, until another similar adjustment is made, operates the picker to produce laps within the tolerance limit permitted by the thus adjusted counterweights.

From the foregoing description it will be obvious that an operator has very little lifting to do when operating the apparatus embodying the present invention and that a picker lap may be quickly and easily transferred from a picker to the device and from this device to the lap carrier. It will also be understood that indicating whether the lap is within the tolerance range may be very quickly done because it is only necessary to observe the extent of movement of arms 32 from a rest position without either weighing the lap accurately or waiting for the arms 32 to cease oscillating. Since the lap is not being weighed, expensive and accurate scales are not required and much of the time is saved which would be required to determine the weight of a picker lap using such scales. By reason of shortening the time of indicating the weight of the lap and transferring it from the picker machine to the lap carrier, the operator has a correspondingly increased amount of time to devote to attention to the picker machines and may adjust each machine within a shorter length of time after removing a completed lap therefrom. By relieving the operator of the task of lifting picker laps, he is better able to perform his other duties and, moreover, larger laps may be made and handled than when they were transferred manually.

While the present invention has been described in some detail in connection with a specific article, that is, a picker lap, it is to be understood that it is capable of rather widespread use with articles reasonably uniform in weight since it is capable of being used with practically any cylindrical article having a central rod extending therethrough as well as with cylinders or articles of any other shape which are provided with means by which they may be supported on arms 32. While the picker lap carrier on track 80 has been shown because of its close cooperation with the apparatus of this invention, it is to be understood that this carrier may be omitted entirely or varied suitably depending on the nature, shape and weight of the article which is being handled.

Having thus described this invention in such full, clear, concise and exact terms as to enable any person skilled in the art to which it pertains to make and use the same, and having set forth the best mode now contemplated of carrying out this invention, I state that the subject-matter which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. Material handling apparatus comprising parallel, spaced apart, trolley rails, trolleys mounted to run on said rails, a frame supported by said trolleys and including side members disposed below and parallel to said rails and end members connecting the side members, parallel legs depending vertically from the ends of the frame approximately midway between said side members a carriage movable up and down along said legs, article supporting means carried by the carriage and including a horizontal tube fixed to the carriage on one side of the legs, a shaft rotatably mounted in said tube and arms attached to the ends of the shaft, the free ends of said arms being shaped to receive and to support an article thereon, counterweights on the other ends of said arms to balance the arms and said article, and means carried by said carriage to indicate any variation of the article from a predetermined weight range.

2. Material handling apparatus comprising parallel, spaced apart, trolley rails, trolleys mounted to run on said rails, a frame supported by said trolleys and including side members disposed below and parallel to said rails and end members connecting the side members, parallel legs depending vertically from the ends of the frame approximately midway between said side members a carriage movable up and down along said legs, article supporting means including a horizontal tube fixed to the carriage on one side of the legs, a shaft extending through said tube and rotatably carried by said carriage and arms fixed to said shaft near its ends, the free ends of said arms being shaped to receive and to support an article thereon, counterweights on the other ends of said arms to balance the arms and said article, means carried by said carriage to indicate any variation of the article from a predetermined weight range, and means on the carriage to engage one of the counterweights and prevent downward movement of the free ends of said arms when an article is placed thereon.

3. Material handling apparatus comprising parallel, spaced apart, trolley rails, trolleys mounted to run on said rails, a frame supported by said trolleys and including side members disposed below and parallel to said rails and end members connecting the side members, parallel legs depending vertically from the ends of the frame approximately midway between said side members a carriage movable up and down along said legs, article supporting means including a horizontal tube fixed to the carriage on one side of the legs, a shaft extending through said tube and rotatably carried by said carriage and arms fixed to said shaft near its ends, one end of said arms being shaped to receive and to support an article thereon, counterweights on the other ends of said arms to balance the arms and said article, means carried by said carriage to indicate any variation of the article from a predetermined weight range, and a balancing weight carried by one of said arms and movable therealong to balance the arms before the article is deposited thereon.

4. Material handling apparatus comprising parallel, spaced apart, trolley rails, trolleys mounted to run on said rails, a frame supported by said trolleys and including side members disposed below and parallel to said rails and end members connecting the side members, parallel legs depending vertically from the ends of the frame approximately midway between said side members a carriage movable up and down along said legs, means to support a picker lap including a horizontal tube fixed to the carriage on one side of the legs, a shaft extending through said tube and rotatably mounted in said carriage and arms fixed to said shaft near its ends, one end of said arms being shaped to receive the ends of a picker lap mandrel, counterweights on the other ends of said arms to balance the arms and a picker lap thereon, and means to indicate any variation of the lap from a predetermined weight range including an indicating scale mounted on said carriage, a pointer movable along said scale and means connecting the pointer to said shaft for moving the pointer along the scale when the shaft is rotated.

5. Material handling apparatus comprising parallel, spaced apart, trolley rails, trolleys mounted to run on said rails, a frame supported by said trolleys and including side members disposed below and parallel to said rails and end members connecting the side members, parallel legs depending vertically from the ends of the frame approximately midway between said side members a carriage, guide rollers carried by said carriage and engaging said legs on opposite sides, means carried by said head section to move the carriage up and down along said legs, means to support an article to be handled including a horizontal tube fixed to the carriage on one side of the legs, a shaft extending through said tube and rotatably mounted in said carriage and arms fixed to said shaft near its ends, one end of said arms being shaped to receive and support said article, counterweights on the other ends of said arms to balance the arms and said article, and means carried by said carriage to indicate any variation of said article from a predetermined weight range.

6. Material handling apparatus comprising parallel, spaced apart, trolley rails, trolleys mounted to run on said rails, a frame supported by said trolleys and including side members disposed below and parallel to said rails and end members connecting the side members, parallel legs depending vertically from the ends of the frame approximately midway between said side members a carriage, means carried by the head section to move the carriage up and down along said legs, said carriage including end members surrounding said legs and carrying rollers engageable with said legs on all sides, and a tube connecting said end members, means to support an article to be handled including a shaft extending through said tube and rotatably mounted in bearings carried by said end members and arms fixed to said shaft near its ends, one end of said arms being shaped to receive the ends of said article, counterweights on the other ends of said arms to balance the arms and article, and means carried by said carriage to indicate any variation of said article from a predetermined weight range.

7. Material handling apparatus comprising parallel, spaced apart, trolley rails, trolleys mounted to run on said rails, a frame supported by said trolleys and including side members disposed below and parallel to said rails and end members connecting the side members, parallel legs depending vertically from the ends of the frame approximately midway between said side members a carriage, means carried by the head section to move the carriage up and donw along said legs, said carriage including end members surrounding said legs and carrying rollers engageable with said legs on all sides, and a tube connecting said end members, means to support an article to be handled including a shaft extending through said tube and rotatably mounted in bearings carried by said end members and arms fixed to said shaft near its ends, one end of said arms being shaped to receive the ends of said article, counterweights on the other ends of said arms to balance the arms and article, and means carried b said carriage to indicate any variation of said article from a predetermined weight range including an indicating scale, a pointer movable along said scale and means connecting the pointer to said shaft for moving the pointer along the scale when the shaft is rotated.

8. Material handling apparatus comprising parallel, spaced apart, trolley rails, trolleys mounted to run on said rails, a frame supported by said trolleys and including side members disposed below and parallel to said rails and end members connecting the side members, parallel legs depending vertically from the ends of the frame approximately midway between said side members a carriage including end members surrounding said legs and a tube connecting said members, means to move the carriage up and down along said legs including cables attached to said end members and rotatable drums for the cables carried by said head section, means to support an article to be handled including a shaft extending through said tube rotatably mounted in bearings carried by said carriage and arms fixed to said shaft near its ends, one end of said arms being shaped to receive said article, counterweights on the other ends of said arms to balance the arms and article, means on one of said arms to balance the arms, means to indicate any variation of the article from a predetermined weight range, means carried by said carriage to limit the extent of rotational movement of the arms carrying shaft, and means on the carriage to prevent rotation of the arms when an article is placed thereon.

9. Material handling apparatus comprising parallel, spaced apart, trolley rails, trolleys mounted to run on said rails, a frame supported by said trolleys and including side members disposed below and parallel to said rails and end members connecting the side members, parallel legs depending vertically from the ends of the frame approximately midway between said side members a carriage movable up and down along said legs, article supporting means carried by the carriage and including a horizontal tube fixed to the carriage on the outer sides of said legs, a shaft extending through said tube and a horizontal tube extending past said legs and fixed to the carriage at its ends, a shaft extending through said tube and arms rotatably supported by said carriage and arms fixed to the ends of said shafts outside of said legs, the free ends of said arms being shaped to receive and to support an article thereon, counterweights on the other ends of said arms to balance the arms and said article, means carried by said carriage to indicate any variation of the article from a predetermined weight range, and means to prevent oscillation of said arms when an article is placed on the free ends thereof.

10. Material handling apparatus comprising parallel, spaced apart, trolley rails, trolleys mounted to run on said rails, a frame supported by said trolleys and including side members disposed below and parallel to said rails and end members connecting the side members, parallel legs depending vertically from the ends of the frame approximately midway between said side members a carriage movable up and down along said legs, article supporting means carried by the carriage and including arms rotatably supported by the carriage, the free ends of said arms being shaped to receive and to support an article thereon, counterweights on the other ends of said arms to balance the arms and said article, means carried by said carriage to indicate any variation of the article from a predetermined weight range, and means to prevent oscillation of said arms when an article is placed on the free ends thereof including a bar connected to one of said legs and having a cam surface, a bumper engageable with the adjacent counterweight, a roller engageable with said cam surface and means connected to said roller and bumper and rotatably supported by said carriage.

11. Material handling apparatus comprising parallel, spaced apart, trolley rails, trolleys mounted to run on said rails, a frame supported by said trolleys and including side members disposed below and parallel to said rails and end members connecting the side members, parallel legs depending vertically from the ends of the frame approximately midway between said side members a carriage movable up and down along said legs, article supporting means carried by the carriage and including a horiznotal tube fixed to the carriage on the outer sides of said legs, a shaft extending through said tube and a horizontal tube extending past said legs and fixed to the carriage at its ends, a shaft extending through said tube and arms rotatably supported by said carriage and arms fixed to the ends of said shafts outside of said legs, the free ends of said arms being shaped to receive and to support an article thereon, counterweights on the other ends of said arms to balance the arms and said article, and weight regain adjustment means carried by one of said counterweights and including a fixed scale and a weight adjustably movable relative to said scale.

References Cited in the file of this patent

UNITED STATES PATENTS

| | | |
|---|---|---|
| 324,695 | Hollingsworth | Aug. 18, 1885 |
| 1,362,441 | Sawhill | Dec. 14, 1920 |
| 1,840,327 | Paulsen | Jan. 12, 1932 |
| 1,897,171 | Lewis | Feb. 14, 1933 |
| 2,364,493 | Ulinski | Dec. 5, 1944 |
| 2,553,378 | Miller | May 15, 1951 |
| 2,737,303 | Held | Mar. 6, 1956 |
| 2,765,928 | Riemenschneider | Oct. 9, 1956 |
| 2,796,178 | Preschak | June 18, 1957 |

FOREIGN PATENTS

| | | |
|---|---|---|
| 437,385 | Germany | Nov. 19, 1926 |
| 528,189 | France | Aug. 11, 1921 |

UNITED STATES PATENT OFFICE
CERTIFICATE OF CORRECTION

Patent No. 2,982,425                              May 2, 1961

Ralph T. Moore

It is hereby certified that error appears in the above numbered patent requiring correction and that the said Letters Patent should read as corrected below.

Column 3, line 40, after "one" insert -- end --; column 7, line 25, for "donw" read -- down --; line 35, for "b" read -- by --.

Signed and sealed this 26th day of September 1961.

(SEAL)
Attest:

ERNEST W. SWIDER
Attesting Officer

DAVID L. LADD
Commissioner of Patents

USCOMM-DC